United States Patent
Duggana et al.

(10) Patent No.: US 10,404,699 B2
(45) Date of Patent: Sep. 3, 2019

(54) FACILITATING THIRD PARTIES TO PERFORM BATCH PROCESSING OF REQUESTS REQUIRING AUTHORIZATION FROM RESOURCE OWNERS FOR REPEAT ACCESS TO RESOURCES

(71) Applicant: Oracle International Corporation, Redwood Shores, CA (US)

(72) Inventors: Satish Duggana, Bangalore (IN); Amit Jhunjhunwala, Bangalore (IN); Srimant Misra, Hyderabad (IN)

(73) Assignee: Oracle International Corporation, Redwood Shores, CA (US)

( * ) Notice: Subject to any disclaimer, the term of this patent is extended or adjusted under 35 U.S.C. 154(b) by 159 days.

(21) Appl. No.: 14/300,251

(22) Filed: Jun. 10, 2014

(65) Prior Publication Data
US 2015/0237053 A1    Aug. 20, 2015

(30) Foreign Application Priority Data
Feb. 18, 2014   (IN) .............................. 758/CHE/2014

(51) Int. Cl.
*H04L 29/06*  (2006.01)
*G06F 21/33*  (2013.01)

(52) U.S. Cl.
CPC ............ *H04L 63/10* (2013.01); *G06F 21/335* (2013.01); *H04L 63/0807* (2013.01)

(58) Field of Classification Search
CPC ......... G06F 9/543; G06T 11/60; H04L 67/02; H04L 67/04; H04L 63/0428;
(Continued)

(56) References Cited

U.S. PATENT DOCUMENTS 8,667,579 B2    3/2014  Leeder
9,571,494 B2    2/2017  Mogaki
(Continued)

FOREIGN PATENT DOCUMENTS

EP    3108634 B1     1/2018
JP    2013246655    12/2013
(Continued)

OTHER PUBLICATIONS

Choosing an SSO Strategy: SAML vs OAuth2, http://www.mutuallyhuman.com/blog/2013/05/09/choosing-an-sso-strategy-saml-vs-oauth2/, Downloaded circa Sep. 23, 2013, pp. 1-6.
(Continued)

*Primary Examiner* — Ashokkumar B Patel
*Assistant Examiner* — William B Jones
(74) *Attorney, Agent, or Firm* — IPHorizons PLLC; Narendra Reddy Thappeta

(57) ABSTRACT

An aspect of the present disclosure facilitates third parties/server system to perform batch processing of requests requiring authorization from resource owners for repeat access to resources. In one embodiment, a server system/third party selects a next request from a batch of requests, with the next request requiring a protected resource (hosted on a second party) owned by a owner/user (first party). The server system checks whether an access token is present authorizing access of the protected resource by the server system on behalf of the owner. If the access token is not present, the server system communicates in an offline mode with the owner to receive the access token. The server system then processes the next request by accessing the protected resource using the present/received access token.

20 Claims, 7 Drawing Sheets

| User ID | Access Token | Expiry Date | Request Date | Status |
|---|---|---|---|---|
| 11212 | ECEBDFB6EAAF009C975AD91A69AC5B26 | 12-Jan-15 | 12-Jan-14 | Active |
| 278452 | B3FCCDFEF9277B097E0D0933D41DF7F3 | 30-Oct-14 | 28-Oct-13 | Active |
| 360008 | 4A41350F38146AEECB83E737E6A744D1 | 15-Sep-13 | 14-Sep-12 | Expired |
| 715544 | 89F7BCEBDDAAC131162357C47B1254DC | 20-Sep-14 | 17-Sep-13 | Active |
| 578578 | | | 10-Jun-14 | Pending |

(58) Field of Classification Search
CPC ... H04L 63/061; H04L 67/0204; H04L 67/06; H04L 67/2842
USPC .................................................. 726/1, 2, 4
See application file for complete search history.

(56) References Cited

U.S. PATENT DOCUMENTS

| | | | |
|---|---|---|---|
| 2010/0100952 A1* | 4/2010 | Sample | H04L 51/066 726/9 |
| 2010/0212004 A1 | 8/2010 | Fu | |
| 2012/0144501 A1 | 6/2012 | Vangpat et al. | |
| 2012/0216268 A1* | 8/2012 | Kassaei | H04L 9/3234 726/9 |
| 2013/0019295 A1 | 1/2013 | Park et al. | |
| 2013/0091171 A1 | 4/2013 | Lee | |
| 2013/0139241 A1 | 5/2013 | Leeder | |
| 2014/0006930 A1* | 1/2014 | Hollis | G06F 17/2247 715/234 |
| 2014/0230020 A1 | 8/2014 | Mogaki | |
| 2014/0373099 A1* | 12/2014 | Durbha | H04L 63/10 726/4 |
| 2015/0150110 A1* | 5/2015 | Canning | H04L 63/0807 726/9 |

FOREIGN PATENT DOCUMENTS

| | | | |
|---|---|---|---|
| JP | 2013246655 A | 12/2013 | |
| JP | 6006533 B | 10/2016 | |
| WO | WO2013107403 A1 | 7/2013 | |

OTHER PUBLICATIONS

OAuth 2.0 Authentication (Facebook, Google MSN, etc), https://wikis.forgerock.org/confluence/pages/viewpage.action?pageId=14942413, Downloaded circa Sep. 23, 2013, pp. 1-3.

Obtaining Facebook page access tokens: The 4 step program, http://aseriesoftubes.com/articles/obtaining-facebook-page-access-tokens-the-4-step-program/, Downloaded circa Sep. 23, 2013, pp. 1-5.

Salesforce Single Sign-On Implementation Guide, http://login.salesforce.com/help/doc/en/salesforce_single_sign_on.pdf, Date Aug. 30, 2013, pp. 1-43.

Single Sign-On for Desktop and Mobile Applications using SAML and OAuth, http://wiki.developerforce.com/page/Single_Sign-On_for_Desktop_and_Mobile_Applications_using_SAML_and_OAuth, Downloaded circa Sep. 23, 2013, pp. 1-14.

D. Hardt, ED., The OAuth 2.0 Authorization Framework, Internet Engineering Task Force (IETF), Request for Comments: 6749, date Oct. 2012, pp. 1-71, ISSN: 2070-1721.

Lodderstedt et al, OAuth 2.0 Threat Model and Security Considerations, Internet Engineering Task Force (IETF) Request for Comments: 6819, Internet Engineering Task Force (IETF, date Jan. 2013, pp. 1-71, ISSN: 2070-1721.

The International Search Report, dated May 27, 2015, pp. 1-4, International Bureau.

Written Opinion of the International Searching Authority, pp. 1-6, International Bureau.

E. Hammer-Lahav, The OAuth 1.0 Protocol, Internet Engineering Task Force (IETF), Request for Comments: 5849, date Apr. 2010, pp. 1-38, ISSN: 2070-1721.

G. Fletcher, T. Lodderstedt, Z. Zeltsan, OAuth Use Cases draft-ietf-oauth-use-cases-01, OAuth WG Internet-Draft, date Jul. 16, 2012, pp. 1-23.

Communication about intention to grant a European patent dated Jul. 28, 2017 in corresponding European patent application No. 15705380.2.

Decision to grant a European patent dated Dec. 7, 2017 in corresponding European patent application No. 15705380.2.

International Preliminary Report on Patentability Chapter II of the International Application No. PCT/IB2015/050845, dated Jan. 19, 2016, pp. 1-15, International Bureau.

\* cited by examiner

FIG. 4B

| User ID | Access Token | Expiry Date | Request Date | Status |
|---|---|---|---|---|
| 11212 | ECEBDFB6EAAF009C975AD91A69AC5B26 | 12-Jan-15 | 12-Jan-14 | Active |
| 278452 | B3FCCDFEF9277B097E0D0933D41DF7F3 | 30-Oct-14 | 28-Oct-13 | Active |
| 360008 | 4A41350F38146AEECB83E737E6A744D1 | 15-Sep-13 | 14-Sep-12 | Expired |
| 715544 | 89F7BCEBDDAAC131162357C47B1254DC | 20-Sep-14 | 17-Sep-13 | Active |
| 578578 | | | 10-Jun-14 | Pending |

FIG. 4C

| User ID | Access Token | Expiry Date | Request Date | Status |
|---|---|---|---|---|
| 11212 | ECEBDFB6EAAF009C975AD91A69AC5B26 | 12-Jan-15 | 12-Jan-14 | Active |
| 278452 | B3FCCDFEF9277B097E0D0933D41DF7F3 | 30-Oct-14 | 30-Oct-13 | Active |
| 360008 | 4A41350F38146AEECB83E737E6A744D1 | 15-Sep-13 | 15-Sep-12 | Expired |
| 715544 | 89F7BCEBDDAAC131162357C47B1254DC | 20-Sep-14 | 17-Sep-13 | Active |
| 578578 | 7A9426E1E4A433282D02968CC7FF4779 | 12-Jun-15 | 10-Jun-14 | Active |

FACILITATING THIRD PARTIES TO PERFORM BATCH PROCESSING OF REQUESTS REQUIRING AUTHORIZATION FROM RESOURCE OWNERS FOR REPEAT ACCESS TO RESOURCES

PRIORITY CLAIM

The instant patent application is related to and claims priority from the India patent application entitled, "Facilitating Third Parties To Perform Batch Processing Of Requests Requiring Authorization From Resource Owners For Repeat Access To Resources", naming the same Applicant as in the instant patent application, Serial No.: 758/CHE/2014, Filed: 18 Feb. 2014, which is incorporated in its entirety herewith.

BACKGROUND OF THE DISCLOSURE

Technical Field

The present disclosure relates to enterprise systems and more specifically to facilitating third parties to perform batch processing of requests requiring authorization from resource owners for repeat access to resources.

Related Art

A resource refers to any data item such as files, photos, user information, etc. Resources are often 'owned' by owners, but stored and managed by other/second parties. Ownership of a resource implies that the corresponding user (usually a human being) can control who is permitted or denied access to the resource managed by a second party. Such resources are referred to as "protected resources".

An owner can permit access of a resource to a third party by granting appropriate authorization. There is often a need to permit 'repeat' access to a resource, implying that a single authorization can be a basis for multiple accesses over time. OAuth protocol is one open standard, which allows for such authorization for repeat access of the resource on behalf of the owner, as is well known in the relevant arts.

There are situations when batch processing of requests is desirable. Batch processing implies that several requests are accumulated (by appropriate buffering), and processed in a batch (i.e., continue to process the accumulated requests until the processing of all requests is completed) at a later convenient time. Batch processing is generally helpful in large scale environments.

Aspects of the present disclosure facilitate third parties to perform batch processing of requests requiring authorization from resource owners for repeat access to resources.

BRIEF DESCRIPTION OF THE DRAWINGS

Example embodiments of the present disclosure will be described with reference to the accompanying drawings briefly described below.

FIGS. 4B and 4C depicts respective portions of credential data maintained at different time instances in one embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS OF THE DISCLOSURE

1. Overview

According to an aspect of the present disclosure, a batch server/third party receives multiple Srequests to be processed in a batch. The batch server then selects a next request from the received requests, with the next request requiring a protected resource (hosted on a second party) owned by an owner/user (first party). The batch server checks whether an access token is present authorizing access of the protected resource by the batch server on behalf of the owner. If the access token is not present, the batch server communicates in an offline mode with the owner to receive the access token. The batch server then processes the next request by accessing the protected resource using the present/received access token.

Thus, third parties/batch server are facilitated to perform batch processing of requests requiring authorization from resource owners for repeat access to resources.

According to another aspect of the present disclosure, receiving of the access token from a owner in an offline mode is implemented by first sending a communication to the owner for asynchronous authorization of access to said first protected resource. In one embodiment, the communication sent to the owner includes a Uniform Resource Locator (URL), which when selected by the owner causes said authorization grant to be forwarded to the batch server. After receiving an authorization grant for the first protected resource from the owner (in response to the owner selecting the URL), the access token is obtained by sending the received authorization grant to an authorization server.

In one embodiment, the protected resource is hosted on a resource server, with the batch server, the authorization server and the resource server being implemented to support OAuth protocol for authorization of protected resources.

In one embodiment, the protected resource is hosted on a resource server, with the server system, the authorization server and the resource server being implemented to support OAuth protocol for authorization of protected resources.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

Figure 1:
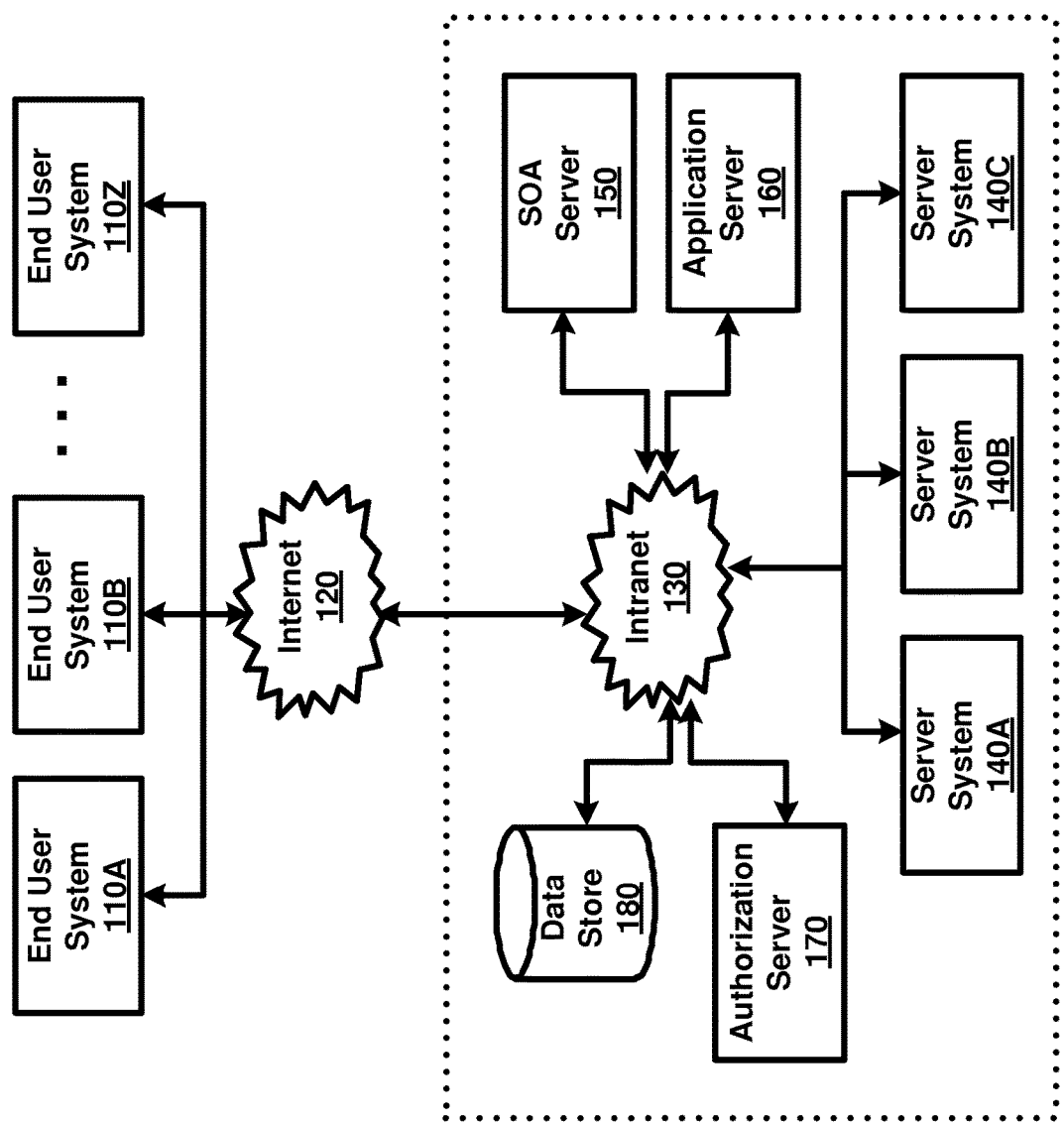
FIG. 1 is a block diagram illustrating an example environment in which several aspects of the present disclosure can be implemented.

FIG. 1 is a block diagram illustrating an example environment in which several aspects of the present disclosure can be implemented. The block diagram is shown containing end user systems 110A-110Z, Internet 120, intranet 130, server systems 140A-140C, SOA (service-oriented architecture) server 150, authorization server 170, and data store 180.

Merely for illustration, only representative number/type of systems is shown in the Figure. Many environments often contain many more systems, both in number and type, depending on the purpose for which the environment is designed. Furthermore, it is assumed that the systems of the enterprise are implemented in accordance with OAuth standard protocol (as described in detail in RFC 6749 entitled "The OAuth 2.0 Authorization Framework"), though other similar protocols can be used in alternative embodiments. Each system/device of FIG. 1 is described below in further detail.

Intranet 130 represents a network providing connectivity between server systems 140A-140C, SOA server 150, authorization server 170 and data store 180, all provided within an enterprise (shown with dotted boundaries). Internet 120 extends the connectivity of these (and other systems of the enterprise) with external systems such as end user systems 110A-110Z. Each of intranet 140 and Internet 120 may be implemented using protocols such as Transmission Control Protocol (TCP) and/or Internet Protocol (IP), well known in the relevant arts. In general, in TCP/IP environments, an IP packet is used as a basic unit of transport, with the source address being set to the IP address assigned to the source system from which the packet originates and the destination address set to the IP address of the destination system to which the packet is to be eventually delivered.

A (IP) packet is said to be directed to a destination system when the destination IP address of the packet is set to the (IP) address of the destination system, such that the packet is eventually delivered to the destination system by network 110. When the packet contains content such as port numbers, which specifies the destination application, the packet may be said to be directed to such application as well. The destination system may be required to keep the corresponding port numbers available/open, and process the packets with the corresponding destination ports. Each of Internet 120 and intranet 130 may be implemented using any combination of wire-based or wireless mediums.

Data store 180 represents a non-volatile (persistent) storage facilitating storage and retrieval of a collection of data by applications executing in other systems of the enterprise such as server systems 140A-140C, SOA server 150 and authorization server 170. Data store 180 may be implemented as a database server using relational database technologies and accordingly provide storage and retrieval of data using structured queries such as SQL (Structured Query Language). Alternatively, data store 180 may be implemented as a file server providing storage and retrieval of data in the form of files organized as one or more directories, as is well known in the relevant arts.

Each of end user systems 110A-110Z represents a system such as a personal computer, workstation, mobile station, mobile phones, computing tablets, etc., used by users to generate and send user requests directed to specific systems of the enterprise. The user requests may be generated using appropriate user interfaces (for example, web pages provided by applications executing in the enterprise). For example, the users may send user requests for performing various tasks to applications executing in server systems 140A-140C. Alternatively, users/owners may manage (create, remove, authorize/deny access to) various resources of interest by sending user requests to the systems of the enterprise over Internet 120.

Each of server systems 140A-140C represents a server, such as a web/application server, capable of protecting and providing access to resources in the enterprise (and as such represents the second party). Some of the protected resources such as applications, web pages provided by the applications, etc. may be hosted on the server system. Alternatively, the protected resources (e.g., personal data, media such as images or videos, etc. may be hosted on backend storage systems (not shown), with the access of such resources being controlled by the server systems. For illustration, the protected resources are shown to be hosted within the enterprise (dotted boundary). However, the features of the present disclosure may be implemented in alternative embodiments where the protected resources may be hosted on systems (not shown) external to the enterprise (with the resources being accessed via the Internet 120), as will be apparent to one skilled in the relevant arts, by reading the disclosure herein.

Application server 160 represents a server, such as a web/application server, capable of executing third party applications that may wish to access some of the protected resources (hosted within the enterprise). The third party applications may require access to the protected resource for processing user requests (for example, received from end user systems 110A-110Z). In one embodiment, the third party applications are designed to operate with authorization server 170 for performing authorization of the protected resources. Upon successful authorization, the third party applications may repeatedly access the authorized protected resource and process the user requests.

Authorization server 170 represents a system such as a server, which facilitates authorization of protected resources (by owners/users), and thereby enables third parties/applications to process requests requiring repeated access to resources. As noted above, authorization server 170 and other systems of the enterprise (such as server systems 140A-140C, application server 160 and data store 180) are implemented to perform the authorization of resources in accordance with OAuth protocol. The manner in which such authorization of protected resources may be performed is described below with examples.

3. Authorization of Protected Resources

Figure 2:
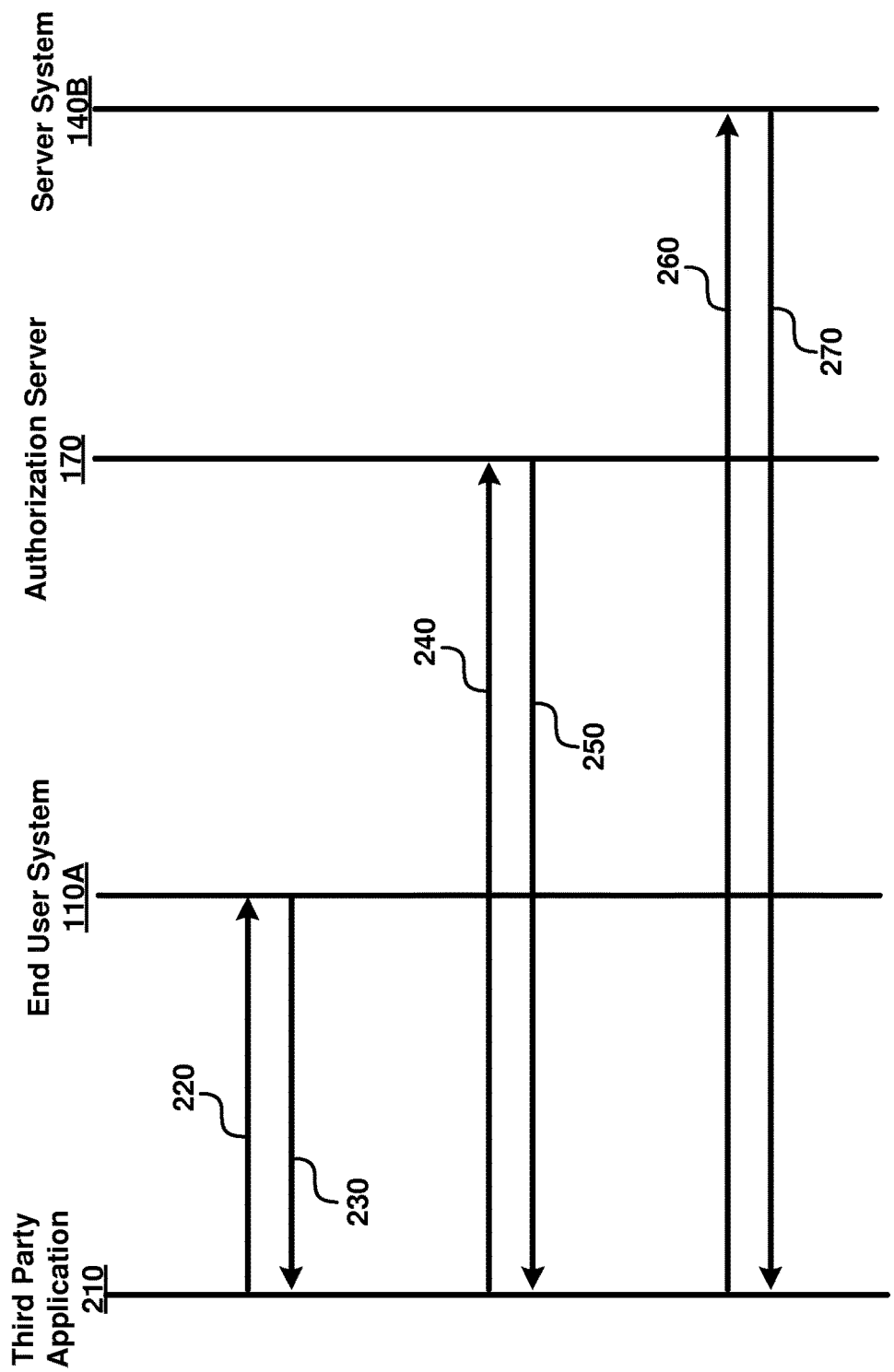
FIG. 2 is a sequence diagram illustrating the manner in which authorization of protected resources is implemented in one embodiment.

FIG. 2 is a sequence diagram illustrating the manner in which authorization of protected resources is implemented according to OAuth protocol in the environment of FIG. 1 in one embodiment. The description is continued assuming that third party application 210 executing in application server 160 requires access to a protected resource hosted in server system 140B, the protected resource being owned by an owner/user using end user system 110A. While the description is provided in accordance with OAuth protocol for illustration, it should be appreciated the features may be implemented with other similar authorization protocols, as suited in the corresponding environments.

Third party application 210 is shown sending an authorization request to end user system 110A used by the owner (event 220). The authorization request may indicate the details of the protected resource, the third party application requesting the resource, the number/duration of access required, etc. In response, the user/owner may specify the access rights (view, modify, expiry period for the access, etc.) of the third party application (in general, authorize) for the requested protected resource and thereafter send a response indicating authorization grant (event 230). The authorization grant may indicate the rights specified by the user/owner.

Though not shown, it may be appreciated that the user/owner may be required to authenticate himself/herself with a second party (such as server system 140B that is protecting the resource) prior to providing authorization. The authentication of the user (i.e., establishing the identity of the user) may be performed using an appropriate authentication technique such as using a combination of userid and password, as is well known in the arts. After successful authentication, the user may specify the desired access rights as part of authorization grant. The authentication and authorization may be performed using appropriate user interfaces provided by the second party.

Third party application 210 then sends the authorization grant to authorization server 170 (event 240), which in turn generates an access token corresponding to the authorization grant and sends the generated access token as a response to the authorization grant (event 250). The access token may indicate (typically, in an encrypted form) the details of the third party application requesting access, the protected resource, and the specific access rights (including any expiry period) specified by the owner of the resource.

Third party application 210 thereafter sends the access token to server system 140B, the resource server hosting the resource (event 260) and accordingly is provided access to the protected resource (event 270). It may be appreciated that after an access token is generated, the access token may be thereafter used for repeated access of the protected resource (assuming that the access token has not expired). Third party application 210 may store the access token received from authorization server in data store 180 for facilitating repeated access to the protected resource.

Thus, third party software (210) is facilitated to repeatedly access a protected resource on behalf of an owner based on the authorization provided by the owner. At least in such approaches based on OAuth protocol, it may be appreciated that the generation of the access token requires the active participation of the owner, that is, the owners are required to be "live/online" for providing the necessary authorization.

Several challenges are therefore presented when performing batch processing of multiple requests. As is well known in the relevant arts, processing of multiple requests (received at different prior time instances) together in a batch (at a later time instance) is often performed in the background without any user interaction (as compared, to performing 'live/online'). Such an approach is also not feasible in large scale environment (such as the enterprise of FIG. 1) containing a large number (in the magnitude of thousands) of users/owners, and where users/owners are often added dynamically during the execution of the third party software. Furthermore, the revocation/expiry of the access tokens may necessitate the regeneration of the access tokens.

SOA server 150 provided according to several aspects of the present disclosure, performs batch processing of requests requiring authorization from resource owners for repeat access to resources, while overcoming some of the drawbacks noted above. Such systems processing requests in batches are referred to as batch servers, with SOA server 150 representing a system that processes requests by execution of appropriate business flows. Some of the activities of the executed business flows are implemented as invocations to one or more web services (protected resources) exposed by server systems 140A-140C, with the exposed web services belonging to different owners. The manner in which SOA server 150 performs batch processing of requests requiring access to such protected resources/web services is described below with examples.

4. Batch Processing of Requests

Figure 3A:
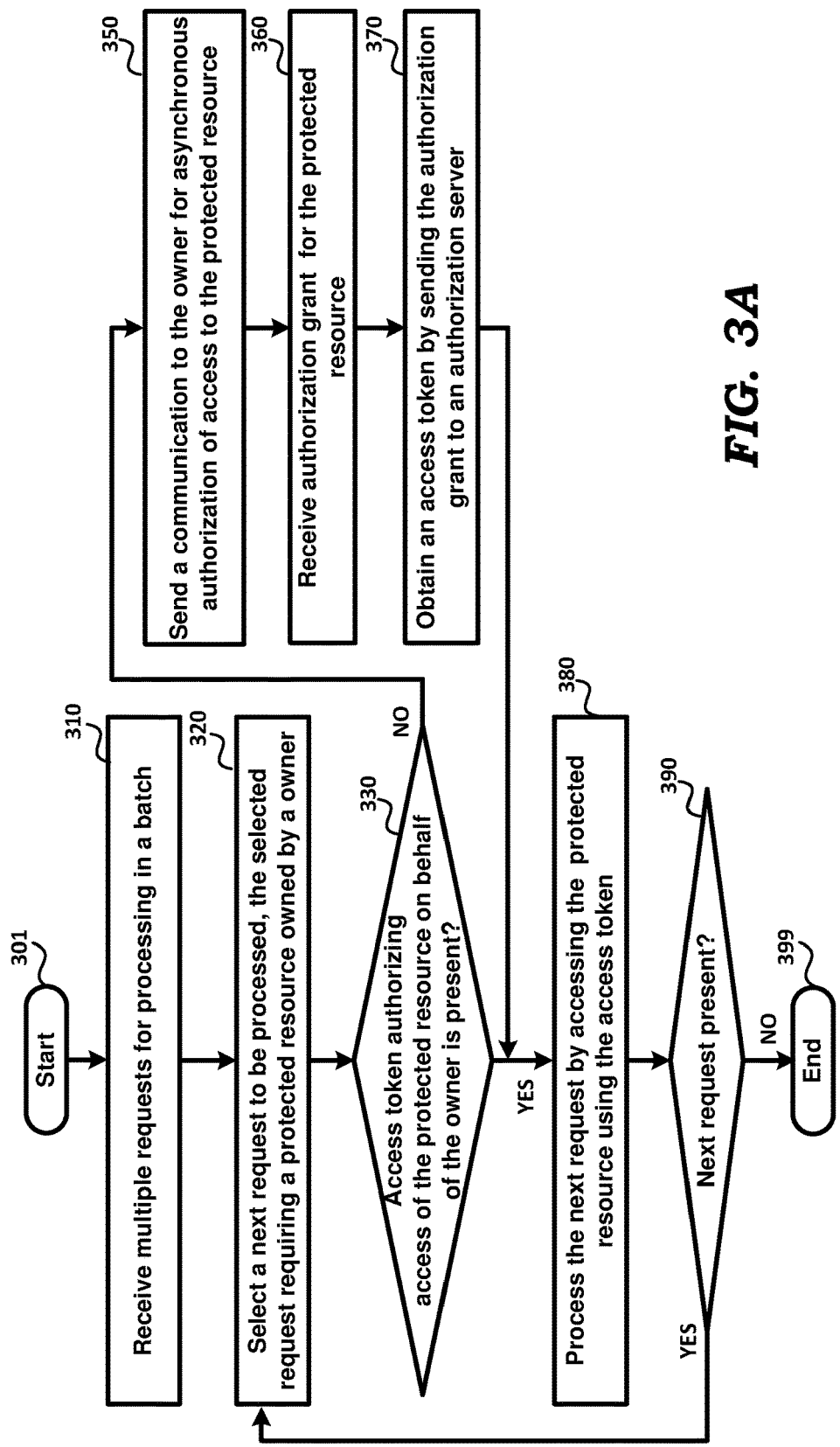
FIG. 3A is a flow chart illustrating the manner in which third parties are facilitated to perform batch processing of requests requiring authorization from resource owners for repeat access to resources according to an aspect of the present disclosure.

FIG. 3A is a flow chart illustrating the manner in which third parties are facilitated to perform batch processing of requests requiring authorization from resource owners for repeat access to resources according to an aspect of the present disclosure. The flowchart is described with respect to the systems of FIG. 1, in particular, SOA server 150, merely for illustration. However, the features can be implemented in other systems and environments also without departing from the scope and spirit of various aspects of the present disclosure, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present disclosure. The flow chart begins in step 301, in which control immediately passes to step 310.

In step 310, SOA server 150 receives multiple requests for processing in a batch. The requests may be received from end user systems 110A-110Z at different prior time instances spread over a substantially long duration (e.g., over a day), with the requests being buffered for processing starting at a later time instance.

In step 320, SOA server 150 selects a next request to be processed, the selected request requiring a protected resource (e.g. web service) owned by a owner. The selection of the next request may be performed in any convenient manner, for example, based on the received time instances, the priority of the requests, etc. The protected resources may be hosted and or protected by server systems 140B-140C.

In step 330, SOA server 150 checks whether an access token authorizing access of the protected resource on behalf of the owner is present. The check may be performed by inspecting a credential data indicating the previously generated (and not yet expired/revoked) access tokens. The inspection operation is in accordance with the conventions of OAuth protocol, as the access token content is defined by the protocol. Control passes to step 380 if an access token for the required protected resource is present and to step 350 otherwise.

In step 350, SOA server 150 sends a communication to the owner for asynchronous authorization of access to the protected resource. Any necessary authentication, etc., as described above, may be performed as a part of such asynchronous authorization.

The word 'asynchronous' implies that the owner is not required to substantially immediately respond (as would be required in synchronous/online response modes) to the communication, but can respond at a later convenient time (e.g., in a few hours/days, etc.). While the communication is described as being a URL in the below described embodiments, alternative approaches can employ code snippets (e.g., applets), as will be apparent to a skilled practitioner by reading the disclosure provided herein.

In step 360, SOA server 150 receives authorization grant for the protected resource, upon the owner providing the asynchronous authorization. In step 370, SOA server 150 obtains an access token by sending the authorization grant to authorization server 170, similar to events 240 and 250 of FIG. 2. It should be appreciated that the steps of 350, 360 and 370 are performed in an offline mode, that is, without requiring the owner to be live/online.

In step 380, SOA server 150 processes the next request by accessing the protected resource using the previously present/obtained access token (similar to events 260 and 270 of FIG. 2). In step 390, SOA server 150 determines whether more requests are required to be processed in the batch. Control passes to step 320 if more requests are present (and accordingly the next requests are processed), and to step 399 otherwise. The flow chart ends in step 399.

Figure 3B:
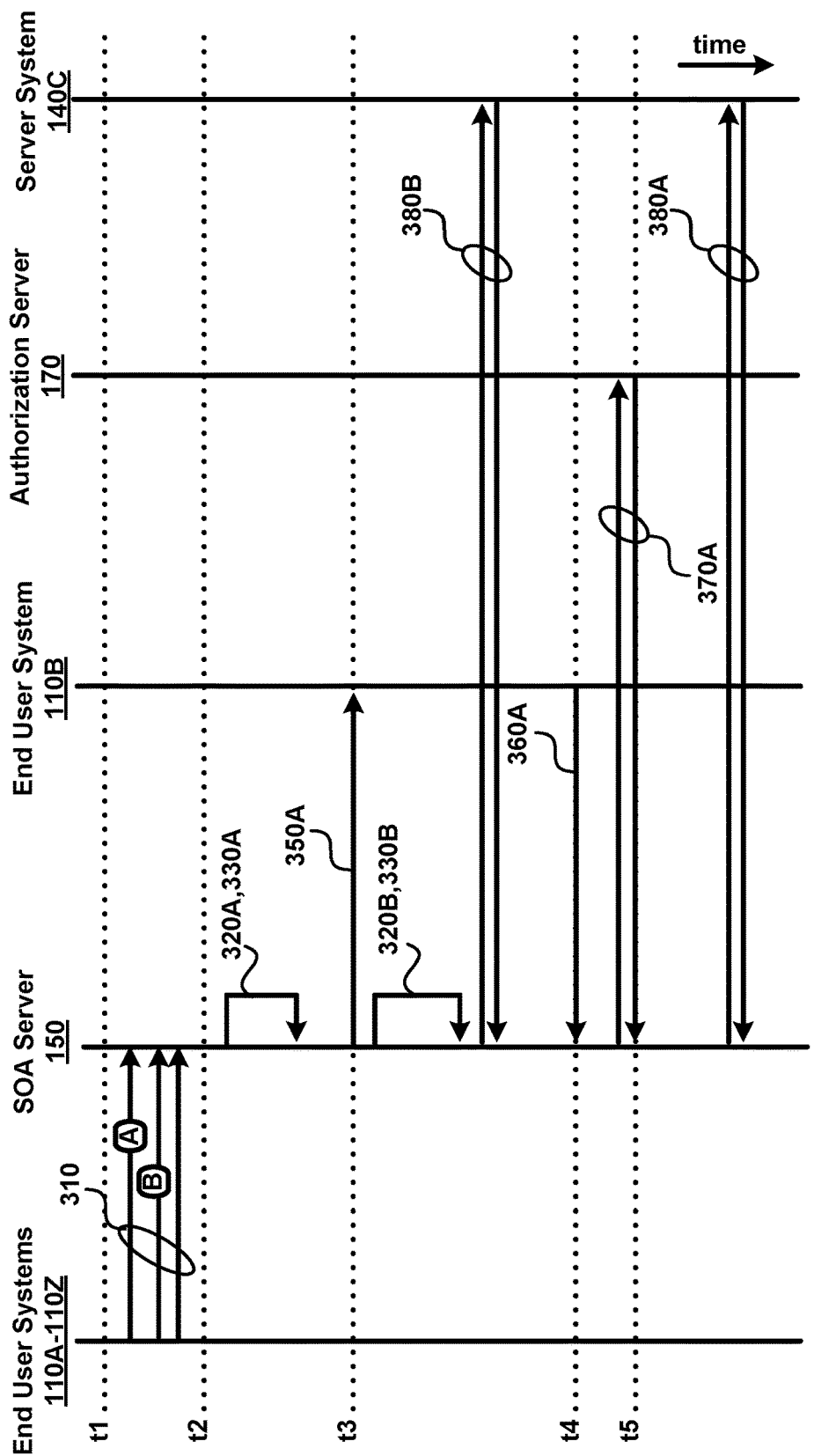
FIG. 3B is a sequence diagram illustrating the manner in which the steps of FIG. 3A are implemented in one embodiment.

FIG. 3B is a sequence diagram illustrating the manner in which the steps of FIG. 3A are implemented in one embodiment. Specifically, the events of FIG. 3B correspond to processing of two different requests A and B of a batch according to the steps of FIG. 3A.

T1, t2, t3, t4, and t5 represent the different time instances at which the events occur. The events are shown with the same reference numbers as those shown for the steps of FIG. 3A, but with A or B appended to distinguish between the events for requests A and B respectively.

Thus, upon selecting request A for processing, SOA server 150 determines that no access token is present and accordingly obtains the access token in offline mode. Request A is accordingly shown having events 320A, 330A, 350A, 360A, 370A and 380A corresponding to similarly named steps in FIG. 3A. Upon selecting request B for processing, SOA server 150 determines that an access token is present and accordingly processes the request (events 320B, 330B and 380B).

Thus, SOA server 150 performs batch processing of requests requiring authorization from resource owners for repeat access to resources. The manner in which SOA server 150 may perform batch processing of request according to FIGS. 3A and 3B is illustrated below with examples.

5. Illustrative Example

Figure 4A:
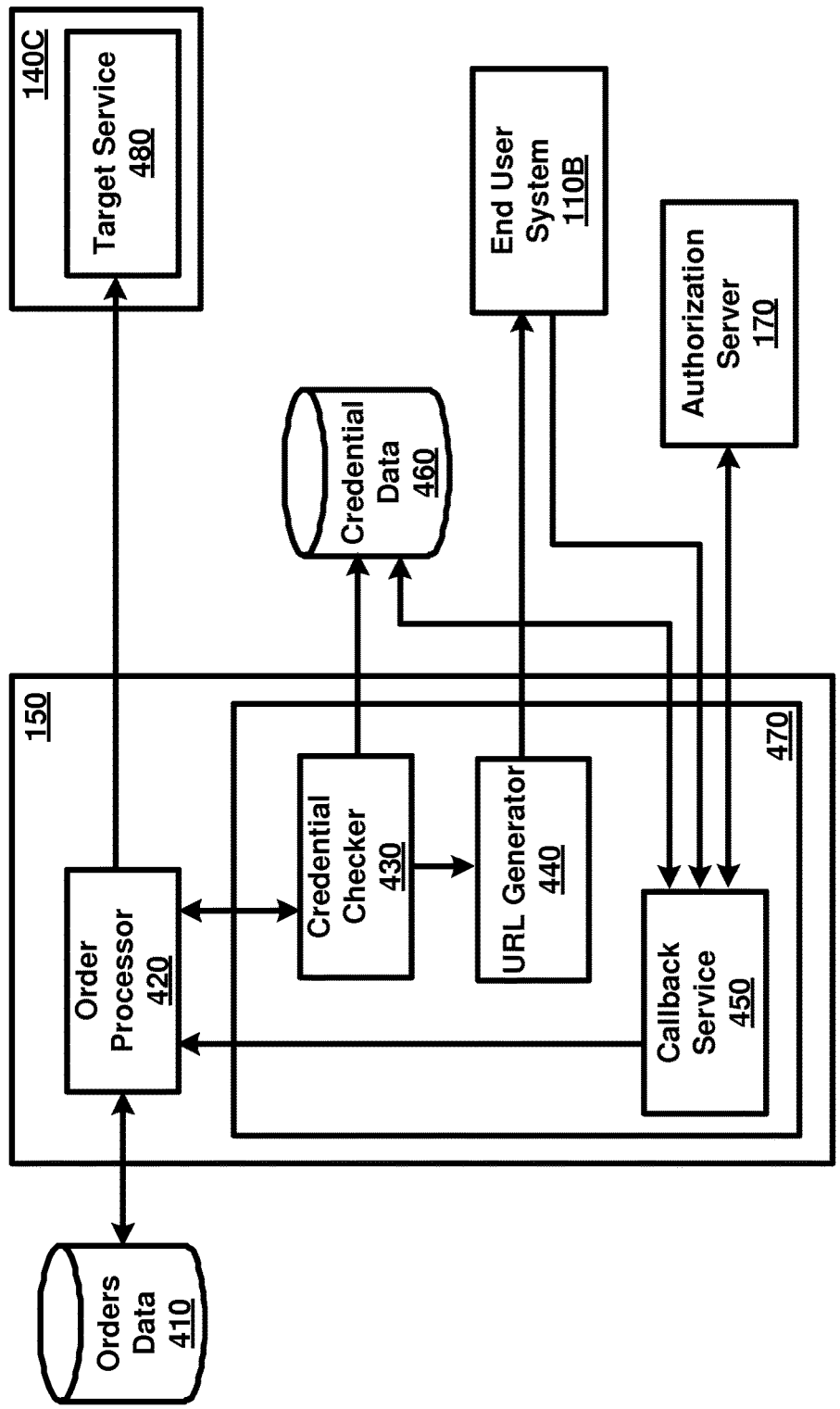
FIG. 4A illustrates an example implementation of a server performing batch processing of requests requiring authorization from resource owners for repeat access to resources in one embodiment.

FIGS. 4A-4C together illustrate the manner in which third parties are facilitated to perform batch processing of requests requiring authorization from resource owners for repeat access to resources in one embodiment. Each of the Figures is described in detail below.

FIG. 4A illustrates an example implementation of a server (SOA server 150) performing batch processing of requests requiring authorization from resource owners for repeat access to resources in one embodiment. Broadly, a front-end order application (not shown) generates orders for products and stores the generated orders in a non-volatile storage (e.g. orders data 410 in data store 180). The orders are then processed in a batch by a business flow (order processor 420) executing in SOA server 150.

One of the activities to be performed as part of processing an order is to periodically update, on behalf of the customer organization (who has placed the order), a personal website (e.g. Twitter™) with the current status of the order (e.g., "Order received", "Order processing started", "Invoice generated", etc.). It is assumed that the personal website allows users to create various accounts and to post messages on to such accounts. Other users (followers) may follow the desired accounts, whereby the followers automatically receive the messages of such desired accounts.

Thus, for SOA server 150 to be able to post the order status (and thus provide the requisite periodic update to followers of account of the customer organization), SOA server 150 needs to be provided authorization of the account of the customer organization. In other words, the account is viewed as a protected resource, which is to be accessed on behalf of the customer organization. As may be appreciated, OAuth described above is generally designed for providing such access to third parties. However, when requests are processed in a batch, there are several challenges, some of which are noted above.

SOA server 150 addresses at least some of such challenges, as described in detail below with respect to FIGS. 4A and 4B.

Orders data 410 (maintained in data store 180, in one embodiment) specifies the details of the requests/orders (generated and stored by the front-end order application) sought to be processed in a batch. Order processor 420 represents a business flow executing in SOA server 150, and which is enabled to perform batch processing of orders. As part of the business flow, order processor 420 is designed to invoke target (web) service 480 exposed by server system 140C to update the customer's account on the personal website with the current status of processing the order.

Accordingly, order processor 420 in response to selecting an order/request from the received orders (maintained in orders data 410), first interfaces with credential checker 430 to determine whether an access token for target server 480 is already present. Credential checker 430 inspects credential data 460 to determine whether the access token (for enabling order processor 420 to access the customer's account on the personal website) is present. The manner in which credential data may be maintained and used for obtaining the access token in an offline mode is described below with examples.

6. Credential Data

FIGS. 4B and 4C depicts respective portions of credential data (460) maintained at different time instances in one embodiment. For illustration, it is assumed that the credential data is also (along with orders data 410) stored in data store 180, implemented as a database server. Accordingly, credential data 460 is shown maintained in the form of a table in a database in the database server. However, in alternative embodiments, the credential data may be maintained using other data structures (such as trees, associative arrays, etc.) and/or in any other format such as XML (Extensible Markup Language), as will be apparent to one skilled in the relevant arts by reading the disclosure herein.

Referring to FIG. 4B, credential data/table 460 is shown containing five columns with column "User ID" specifying a unique identifier of the user/owner, column "Access Token" specifying the access token that has been generated for the user/owner, column "Expiry Date" indicating the date until which the access token is valid, column "Request Date" indicating the date on which a communication for obtaining the access token in an offline mode was sent (to the owner/user by SOA server 150) and column "Status" indicating the current status ("Active", "Expired", "Revoked", "Pending" etc.) of the access token.

Each of the rows of table 460 specifies the details of the access token received from a corresponding user/owner. As noted above, the access token specifies (in an encrypted form) the details of the third party application requesting access, the protected resource, and the specific access rights (including any expiry period) specified by the owner of the resource. An access token is deemed to be present when the status is "Active" and the corresponding value in column "Access Token" is not blank.

Thus, the credential data (460) for different users/owners of protected resources is maintained by SOA server 150. During the processing of a request, credential checker 430 checks whether an access token of the customer is present in table 460.

In the scenario that the access token authorizing order processor 420 to access target service 480 on behalf of the owner is present, credential checker 430 forwards the access token to order processor 420. Order processor 420 then access target service 480 using the provided access token, thereby updating the customer's account on the personal website with the current status.

In the scenario that the access token is not present, credential checker 430 first stores the details of the order such as the owner/user from whom the authorization is to be obtained, the date on which the request for authorization is sent, the status as "Pending", etc., in table 460 (as shown in row 490). Credential checker 430 then sends an indication (along with other data such as the user ID) to URL generator 440 that the owner of target service 480 is to be communicated with in an offline mode to obtain the access token. URL generator 440, in response to the indication, generates and sends to the owner (determined based on the received user ID), an URL which when selected asynchronously by the owner causes an authorization grant for the protected resource to be forwarded to callback service 450. Such an URL may be generated in any convenient manner.

An example URL format that causes the authorization grant for target service 480 to be forward to callback service 450 is shown below:

https://domain-name/authrequest?callbackuri=<http://domain-name/CredentialCallbackService&user-id=578578> wherein,

"domain-name" is the domain of the enterprise hosting the third party application;

"authrequest" is the name of the service (e.g. provided by server system 140C or authorization server 170) used to generate the authorization grant and which is invoked upon the user/owner selecting the URL;

"callbackuri" is a keyword indicating that the authorization grant is to be forwarded to the URI (universal resource identifier) specified as the value ("http://domain-name/CredentialCallbackService") of the keyword;

"CredentialCallbackService" is the identify of the call back service (450); and

"user-id" is a keyword indicating the user/owner ID (e.g. 578578) for whom the access token is generated.

The URL may then be delivered to the owner in a known way, for example, as part of an email message sent to the inbox of the owner, in the form of a short message service (SMS) message sent to the mobile device (e.g., 110A) of the owner, etc. The URL may thereafter be selected by the owner at a later time instance (asynchronously), for example (potentially after several days), when accessing the email from the inbox using end user system 110A, while viewing the SMS message in the mobile device, etc. The owner then selects the URL, performs any necessary authentication with server system 140C (hosting the protected resource), and then creates an authorization grant (indicating the specific authorizations specified by the owner) for target service 480. Due to the format of the URL, the newly created authorization grant is forwarded to callback service 450.

It may be appreciated that after sending the communication to the owner, order processor 420 does not wait for the reply to the communication (as would be required in synchronous communications), but continues with the processing of the selected order and/or other orders in the batch.

Callback service 450 receives the authorization grant, and then obtains an access token by sending the authorization grant to authorization server 170, similar to events 240 and 250 of FIG. 2. Callback service 450 then stores the newly obtained access token as part of credential data 460 (row 495 of FIG. 4C), and then notifies order processor 420 that the access token is present. Order process 420 may thereafter interface with credential checker 430 to retrieve the newly obtained access token from credential data 460 and processes the orders requiring accesses to target service 480.

Thus, the third party order processor 420 is facilitated to perform batch processing of orders/requests requiring authorization from resource owners (first party) for repeat access to resources/web services (hosted/protected by second parties such as server systems 140A-140C).

It should be appreciated that the features described above can be implemented in various embodiments as a desired combination of one or more of hardware, executable modules, and firmware. The description is continued with respect to an embodiment in which various features are operative when executable modules are executed.

7. Digital Processing System

Figure 5:
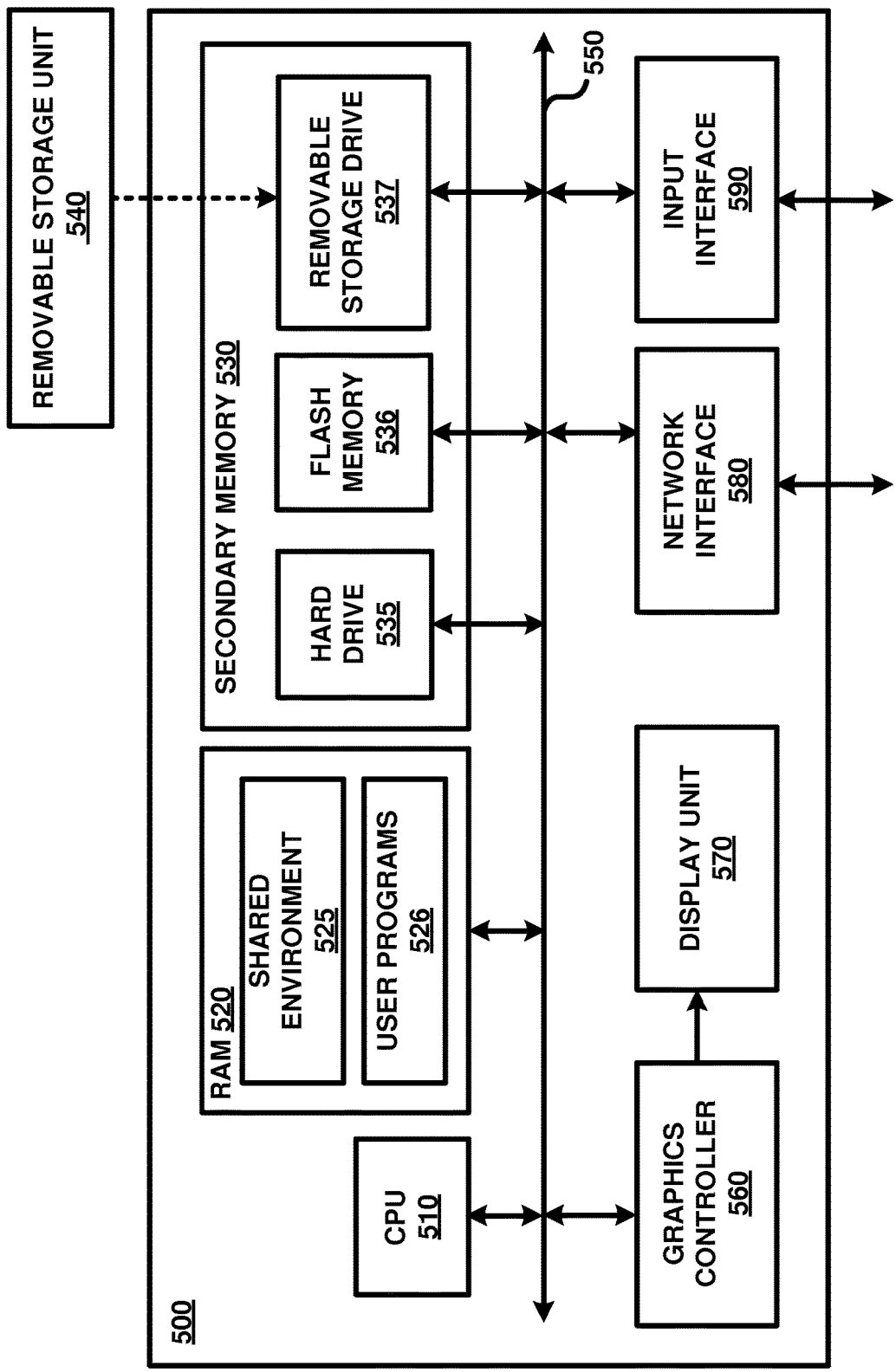
FIG. 5 is a block diagram illustrating the details of a digital processing system in which various aspects of the present disclosure are operative by execution of appropriate executable modules.

FIG. 5 is a block diagram illustrating the details of digital processing system 500 in which various aspects of the present disclosure are operative by execution of appropriate executable modules. Digital processing system 500 may correspond to SOA server 150.

Digital processing system 500 may contain one or more processors such as a central processing unit (CPU) 510, random access memory (RAM) 520, secondary memory 530, graphics controller 560, display unit 570, network interface 580, and input interface 590. All the components except display unit 570 may communicate with each other over communication path 550, which may contain several buses as is well known in the relevant arts. The components of FIG. 5 are described below in further detail.

CPU 510 may execute instructions stored in RAM 520 to provide several features of the present disclosure. CPU 510 may contain multiple processing units, with each processing unit potentially being designed for a specific task. Alternatively, CPU 510 may contain only a single general-purpose processing unit.

RAM 520 may receive instructions from secondary memory 530 using communication path 550. RAM 520 is shown currently containing software instructions constituting operating environment 525 and/or other user programs 526 (such as database software, etc.). In addition to operating environment 525, RAM 520 may contain other software programs such as device drivers, virtual machines, etc., which provide a (common) run time environment for execution of other/user programs.

Graphics controller 560 generates display signals (e.g., in RGB format) to display unit 570 based on data/instructions received from CPU 510. Display unit 570 contains a display screen to display the images defined by the display signals. Input interface 590 may correspond to a keyboard and a pointing device (e.g., touch-pad, mouse) and may be used to provide inputs. Network interface 580 provides connectivity to a network (e.g., using Internet Protocol), and may be used to communicate with other systems connected to the network (120 and 130 of FIG. 1).

Secondary memory 530 may contain hard drive 535, flash memory 536, and removable storage drive 537. Secondary memory 530 may store the data (for example, portions of the URL) and software instructions (for implementing the steps of FIGS. 3A and 3B), which enable digital processing system 500 to provide several features in accordance with the present disclosure. The code/instructions stored in secondary memory 530 may either be copied to RAM 520 prior to execution by CPU 510 for higher execution speeds, or may be directly executed by CPU 510.

Secondary memory 530 may contain hard drive 535, flash memory 536, and removable storage drive 537. Some or all of the data and instructions may be provided on removable storage unit 540, and the data and instructions may be read and provided by removable storage drive 537 to CPU 510. Removable storage unit 540 may be implemented using medium and storage format compatible with removable storage drive 537 such that removable storage drive 537 can read the data and instructions. Thus, removable storage unit 540 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 540 or hard disk installed in hard drive 535. These computer program products are means for providing software to digital processing system 500. CPU 510 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 530. Volatile media includes dynamic memory, such as RAM 520. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 550. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

8. Conclusion

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present disclosure in any way.

What is claimed is:

1. A method performed in a batch server, said method comprising:

receiving a plurality of requests from a plurality of users at different time instances spread over receipt duration between a first time instance and a second time instance, wherein said second time instance follows said first time instance in said receipt duration;

buffering, in said receipt duration between said first time instance and said second time instance, said plurality of requests for processing in a batch in a later duration, said later duration being after said receipt duration, wherein said processing in said batch in said later duration after said receipt duration comprises:

selecting a next request from said plurality of requests buffered for processing, said next request having been received from a first user of said plurality of users in said receipt duration and requiring a first protected resource owned by a first owner, wherein access to said first protected resource is controlled by a server system, said server system requires an access token generated by an authorization server for permitting access to said first protected resource;

checking whether said access token is present authorizing access of said first protected resource by said batch server on behalf of said first owner;

if said access token is not present, communicating in an offline mode with said first owner to receive said access token from said authorization server in said later duration, wherein said communicating comprises sending a communication to said first owner at a third time instance and thereafter receiving said access token at a fifth time instance, wherein said third time instance and said fifth time instance are in said later duration after said receipt duration, wherein, in response to said communication, said first owner authenticates himself or herself and then authorizes said batch server to access said first protected resource after said third time instance, wherein said authorization server generates said access token in said offline mode at said fifth time instance upon said first owner authorizing said batch server to access said first protected resource; and accessing said first protected resource using said access token after said fifth time instance to complete processing of said next request, wherein between said third time instance and said fifth time instance in said later duration, said batch server continues said processing of multiple requests of said plurality of requests for which corresponding access tokens are determined to be present by said checking.

2. The method of claim 1, wherein said communication is sent at said third time instance to said first owner for asynchronous authorization of access to said first protected resource, said communicating in said offline mode further comprises:

receiving, at a fourth time instance, an authorization grant for said first protected resource upon said first owner providing authorization, wherein said fourth time instance is in said later duration after said second time instance and is between said third time instance and said fifth time instance; and obtaining said access token by sending said authorization grant to said authorization server, wherein said asynchronous authorization implies that said first owner is not required to be online at said third time instance.

3. The method of claim 2, wherein said communication is an email message or a short message service (SMS) message.

4. The method of claim 3, wherein said communication includes a Uniform Resource Locator (URL), which when selected asynchronously by said first owner causes said authorization grant to be forwarded to said batch server, wherein said receiving receives said authorization grant in response to said first owner selecting said URL and authorising access to said first protected resource.

5. The method of claim 4, further comprising maintaining credential data indicating the access tokens generated for owners including said first owner, wherein said checking comprises inspecting said credential data to determine whether said access token is present for said first owner.

6. The method of claim 5, wherein said batch server, said authorization server and said server system are implemented to support OAuth protocol for authorization of protected resources.

7. The method of claim 5, wherein said batch server is a Service Oriented Architecture (SOA) server, wherein said plurality of requests correspond to a plurality of orders such that said next request is a next order, wherein said first protected resource is an account in a personal website, wherein said first owner is an administrator who authorizes access to said account, wherein said processing of said next order comprises updating said account with a current status of processing of said next order.

8. A non-transitory machine readable medium storing one or more sequences of instructions, wherein execution of said one or more sequences of instructions by one or more processors contained in a batch server enables said batch server to perform the actions of:

receiving a plurality of requests from a plurality of users at different time instances spread over a receipt duration between a first time instance and a second time instance, wherein said second time instance follows said first time instance in said receipt duration;

buffering, in said receipt duration between said first time instance and said second time instance, said plurality of requests for processing in a batch in a later duration, said later duration being after said receipt duration, wherein said processing in said batch in said later duration after said receipt duration comprises:

selecting a next request from said plurality of requests buffered for processing, said next request having been received from a first user of said plurality of users in said receipt duration and requiring a first protected resource owned by a first owner, wherein access to said first protected resource is controlled by a server system, said server system requires an access token generated by an authorization server for permitting access to said first protected resource;

checking whether said access token is present authorizing access of said first protected resource by said batch server on behalf of said first owner;

if said access token is not present, communicating in an offline mode with said first owner to receive said access token from said authorization server in said later duration, wherein said communicating comprises sending a communication to said first owner at a third time instance and thereafter receiving said access token at a fifth time instance, wherein said third time instance and said fifth time instance are in said later duration after said receipt duration, wherein, in response to said communication, said first owner authenticates himself or herself and then authorizes said batch server to access said first protected resource after said third time instance, wherein said authorization server generates said access token in said offline mode at said fifth time instance upon said first owner authorizing said batch server to access said first protected resource; and accessing said first protected resource using said access token after said fifth time instance to complete processing of said next request, wherein between said third time instance and said fifth time instance in said later duration, said batch server continues said processing of multiple requests of said plurality of requests for which corresponding access tokens are determined to be present by said checking.

9. The machine readable medium of claim 8, wherein said communication is sent at said third time instance to said first owner for asynchronous authorization of access to said first protected resource, said communicating in said offline mode further comprises one or more instructions for:

receiving, at a fourth time instance, an authorization grant for said first protected resource upon said first owner providing authorization, wherein said fourth time instance is in said later duration after said second time instance and is between said third time instance and said fifth time instance; and obtaining said access token by sending said authorization grant to said authorization server, wherein said asynchronous authorization implies that said first owner is not required to be online at said third time instance.

10. The machine readable medium of claim 9, wherein said communication is an email message or a short message service (SMS) message.

11. The machine readable medium of claim 10, wherein said communication includes a Uniform Resource Locator (URL), which when selected asynchronously by said first owner causes said authorization grant to be forwarded to said batch server,
wherein said receiving receives said authorization grant in response to said first owner selecting said URL and authorising access to said first protected resource.

12. The machine readable medium of claim 11, further comprising one or more instructions for maintaining credential data indicating the access tokens generated for owners including said first owner,
wherein said checking comprises one or more instructions inspecting said credential data to determine whether said access token is present for said first owner.

13. The machine readable medium of claim 12, wherein said batch server, said authorization server and said server system are implemented to support OAuth protocol for authorization of protected resources.

14. A batch server comprising:
a processor;
a random access memory (RAM);
a machine readable medium to store one or more instructions, which when retrieved into said RAM and executed by said processor causes said batch server to perform the actions of:
receiving a plurality of requests from a plurality of users at different time instances spread over a receipt duration between a first time instance and a second time instance, wherein said second time instance follows said first time instance in said receipt duration;
buffering, in said receipt duration between said first time instance and said second time instance, said plurality of requests for processing in a batch in a later duration, said later duration being after said receipt duration,
wherein said processing in said batch in said later duration after said receipt duration comprises:
selecting a next request from said plurality of requests buffered for processing, said next request having been received from a first user of said plurality of users in said receipt duration and requiring a first protected resource owned by a first owner,
wherein access to said first protected resource is controlled by a server system, said server system requires an access token generated by an authorization server for permitting access to said first protected resource;
checking whether said access token is present authorizing access of said first protected resource by said batch server on behalf of said first owner;
if said access token is not present, communicating in an offline mode with said first owner to receive said access token from said authorization server in said later duration,
wherein said communicating comprises sending a communication to said first owner at a third time instance and thereafter receiving said access token at a fifth time instance, wherein said third time instance and said fifth time instance are in said later duration after said receipt duration,
wherein, in response to said communication, said first owner authenticates himself or herself and then authorizes said batch server to access said first protected resource after said third time instance, wherein said authorization server generates said access token in said offline mode at said fifth time instance upon said first owner authorizing said batch server to access said first protected resource; and
accessing said first protected resource using said access token after said fifth time instance to complete processing of said next request,
wherein between said third time instance and said fifth time instance in said later duration, said batch server continues said processing of multiple requests of said plurality of requests for which corresponding access tokens are determined to be present by said checking.

15. The batch server of claim 14, wherein said communication is sent at said third time instance to said first owner for asynchronous authorization of access to said first protected resource, wherein for said communicating in said offline mode, said batch server performs the actions of:
receiving, at a fourth time instance, an authorization grant for said first protected resource upon said first owner providing authorization, wherein said fourth time instance is in said later duration after said second time instance and is between said third time instance and said fifth time instance; and
obtaining said access token by sending said authorization grant to said authorization server,
wherein said asynchronous authorization implies that said first owner is not required to be online at said third time instance.

16. The batch server of claim 15, wherein said communication is an email message or a short message service (SMS) message.

17. The batch server of claim 16, wherein said communication includes a Uniform Resource Locator (URL), which when selected asynchronously by said first owner causes said authorization grant to be forwarded to said batch server,
wherein said batch server receives said authorization grant in response to said first owner selecting said URL and authorising access to said first protected resource.

18. The batch server of claim 17, further performing the actions of maintaining credential data indicating the access tokens generated for owners including said first owner,
wherein for said checking, said batch server performs the actions of inspecting said credential data to determine whether said access token is present for said first owner.

19. The batch server of claim 18, wherein said batch server, said authorization server and said server system are implemented to support OAuth protocol for authorization of protected resources.

20. The batch server of claim 19, wherein said batch server is a Service Oriented Architecture (SOA) server, wherein said plurality of requests correspond to a plurality of orders such that said next request is a next order,
wherein said first protected resource is an account in a personal website, wherein said first owner is an administrator who authorizes access to said account,
wherein said processing of said next order comprises updating said account with a current status of processing of said next order.

* * * * *